(12) United States Patent
Kim et al.

(10) Patent No.: US 9,885,904 B2
(45) Date of Patent: Feb. 6, 2018

(54) DISPLAY DEVICE

(71) Applicant: BOE TECHNOLOGY GROUP CO., LTD., Beijing (CN)

(72) Inventors: Ki Man Kim, Beijing (CN); Jaegeon You, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 158 days.

(21) Appl. No.: 14/761,759

(22) PCT Filed: Oct. 21, 2014

(86) PCT No.: PCT/CN2014/089023
§ 371 (c)(1),
(2) Date: Jul. 17, 2015

(87) PCT Pub. No.: WO2016/004699
PCT Pub. Date: Jan. 14, 2016

(65) Prior Publication Data
US 2016/0252773 A1    Sep. 1, 2016

(30) Foreign Application Priority Data

Jul. 8, 2014  (CN) .......................... 2014 1 0324068

(51) Int. Cl.
*G09G 3/36*        (2006.01)
*G02F 1/1335*      (2006.01)
(Continued)

(52) U.S. Cl.
CPC .. *G02F 1/133514* (2013.01); *G02F 1/133308* (2013.01); *G02F 1/133528* (2013.01);
(Continued)

(58) Field of Classification Search
CPC ......... G02F 1/133514; G02F 1/133308; G02F 1/133528; G02F 2001/133388;
(Continued)

(56) References Cited

U.S. PATENT DOCUMENTS

2005/0140839 A1*  6/2005  Ki Hong ........... G02F 1/133528
                                                  349/43
2008/0074585 A1   3/2008  Yoshimi
(Continued)

FOREIGN PATENT DOCUMENTS

CN          101261397 A       9/2008
CN          201867507 U       6/2011
(Continued)

OTHER PUBLICATIONS

Chinese Office Action in Chinese Application No. 201410324068.5 dated May 18, 2016 with English translation.
(Continued)

*Primary Examiner* — Premal Patel
(74) *Attorney, Agent, or Firm* — Collard & Roe, P.C.

(57) ABSTRACT

A display device is provided, the display device comprising a display panel, the display panel including an opposed substrate (1) and an array substrate (2) arranged opposite to each other, and a liquid crystal layer (3) arranged therebetween, the display panel being divided into a central region (61) and a peripheral region (62) surrounding the central region (61), and an additional polarizer (6) being arranged in a region between the array substrate (2) and the liquid crystal layer (3) and corresponding to the peripheral region (62). The display device can effectively prevent the peripheral region (62) of the display panel from light leakage.

18 Claims, 2 Drawing Sheets

(51) Int. Cl.
*G02F 1/1333* (2006.01)
*G09G 3/34* (2006.01)

(52) U.S. Cl.
CPC ............ *G02F 2001/133388* (2013.01); *G09G 3/3406* (2013.01); *G09G 3/36* (2013.01); *G09G 2300/0426* (2013.01)

(58) Field of Classification Search
CPC ......... G09G 3/3406; G09G 2300/0426; G09G 3/36; G09G 2320/0233
See application file for complete search history.

(56) References Cited

U.S. PATENT DOCUMENTS

| | | | |
|---|---|---|---|
| 2010/0177261 A1* | 7/2010 | Jin | G02F 1/13336 349/58 |
| 2014/0098513 A1* | 4/2014 | Yi | G02B 5/003 362/19 |
| 2014/0131643 A1* | 5/2014 | Lee | G02B 5/3033 252/585 |
| 2016/0026039 A1* | 1/2016 | Sakai | G02F 1/133555 345/1.3 |

FOREIGN PATENT DOCUMENTS

| | | |
|---|---|---|
| CN | 203444208 U | 2/2014 |
| CN | 103715219 A | 4/2014 |
| CN | 204065614 U | 12/2014 |
| JP | 2009-109537 A | 5/2009 |

OTHER PUBLICATIONS

International Search Report of PCT/CN2014/089023 in Chinese, dated Apr. 13, 2015 with English translation.
Notice of Transmittal of the International Search Report of PCT/CN2014/089023 in Chinese, dated Apr. 13, 2015.
Written Opinion of the International Searching Authority of PCT/CN2014/089023 in Chinese, dated Apr. 13, 2015 with English translation.

* cited by examiner

DISPLAY DEVICE

CROSS REFERENCE TO RELATED APPLICATIONS

This application is the National Stage of PCT/CN2014/089023 filed on Oct. 21, 2014, which claims priority under 35 U.S.C. § 119 of Chinese Application No. 201410324068.5 filed on Jul. 8, 2014, the disclosure of which is incorporated by reference.

TECHNICAL FIELD

At least one embodiment of the present invention relates to a display device.

BACKGROUND

With improvement of living standards, liquid crystal display (LCD) devices have been widely used in people's daily life. Main components of a liquid crystal display device includes a display panel (Panel) and a back light unit (BLU).

The display panel usually includes a color filter substrate and an array substrate arranged opposite to each other, and a liquid crystal layer arranged therebetween; the array substrate provides a driving electric field to drive liquid crystals to deflect, and the liquid crystals deflect in a displaying process to control whether light emitted from the back light unit is transmitted out or not; and the color filter substrate is to make the transmitted light in a color, thus realizing image display.

According to different deflection states of the liquid crystals in the displaying process, liquid crystal display devices can be divided into liquid crystal display devices of horizontal alignment mode and liquid crystal display devices of vertical alignment mode. Typical horizontal alignment modes include In-Plane Switching (IPS), and ADvanced Super Dimension Switch (ADS, also known as ADSDS); and typical vertical alignment modes include Vertical Alignment (VA), and Twisted Nematic (TN).

SUMMARY

At least one embodiment of the present invention provides a display device, and the display device does not generate light leakage due to an optical path difference, and has relative uniform brightness and a better display effect.

The display device provided by at least one embodiment of the present invention comprises a display panel, the display panel including an opposed substrate and an array substrate arranged opposite to each other, and a liquid crystal layer arranged therebetween. The display panel is divided into a central region and a peripheral region surrounding the central region, and an additional polarizer is arranged in a region between the array substrate and the liquid crystal layer and corresponding to the peripheral region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE SIGNS

1—color filter substrate; 2—array substrate; 3—liquid crystal layer; 4—first polarizer; 5—second polarizer; 6—additional polarizer; 61—central region; 62—peripheral region; 7—back light unit; 71—light source; 72—light guiding plate; 73—scattering pattern.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An inventor of the application notes that, in a liquid crystal display device of horizontal alignment mode such as IPS, ADS, as compared with a liquid crystal display device of vertical alignment mode such as VA, TN, since a frame between the back light unit and the display panel presses the peripheral region of the array substrate, the array substrate will generate an optical path difference, resulting in light leakage to the display panel, and partial light leakage on the display panel will cause decreased performance of the display device in a normal dark mode.

Therefore, people want to avoid light leakage caused by the optical path difference in the liquid crystal display device, and improve poor uniformity due to light leakage in the peripheral region of the display panel while improving image display in the normal dark mode.

Figure 2:
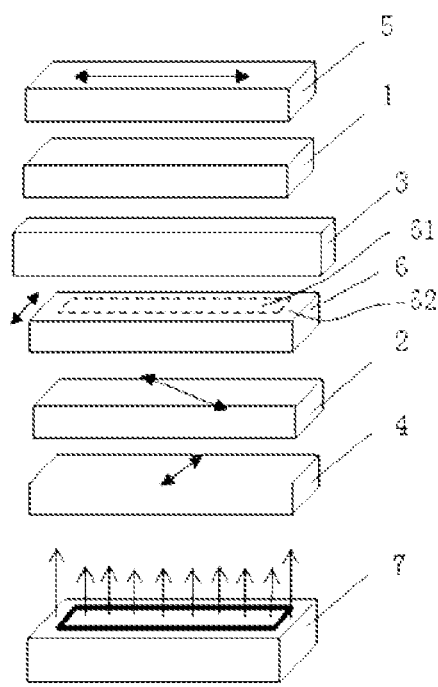
FIG. 2 is a exploded structural schematic diagram of a display device in an embodiment of the present invention.

As shown in FIG. 2, at least one embodiment of the present invention provides a display device; the display device comprises a display panel; the display panel includes an opposed substrate 1 and an array substrate 2 arranged opposite to each other, and a liquid crystal layer 3 arranged between the substrates; the display panel is divided into a central region 61 and a peripheral region 62 surrounding the central region 61, and an additional polarizer 6 is arranged in a region between the array substrate 2 and the liquid crystal layer 3 and corresponding to the peripheral region 62. The opposed substrate may be a color filter substrate or a transparent substrate, i.e., a color filter layer can be arranged on the opposed substrate or the array substrate. Hereinafter, the embodiments take an example that the opposed substrate is a color filter substrate 1 for description.

Figure 4:
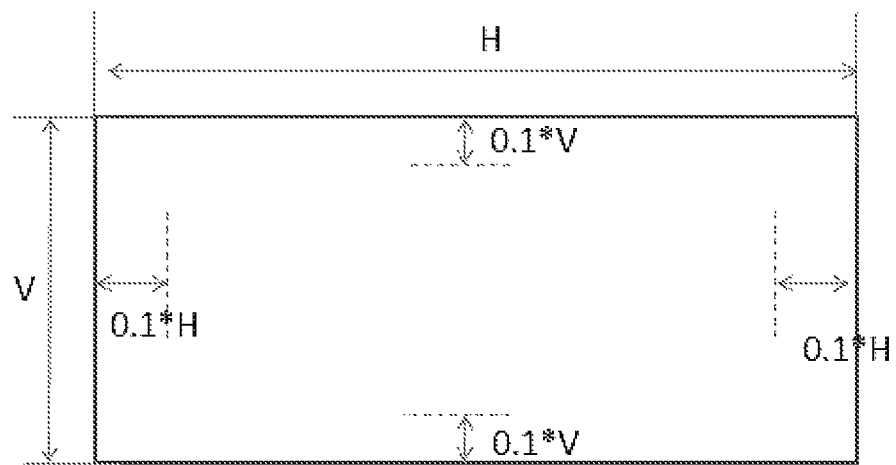
FIG. 4 is a schematic diagram of a central region and a peripheral region of a display panel in the embodiment of the invention.

As shown in FIG. 4, in at least one embodiment of the invention, a width of each frame of the peripheral region 62 of the display panel at a side may be 10%-20% of a length H and a width V of the display panel; for example, the width of each frame of the peripheral region 62 may be 10% of the length H and the width V of the display panel. That is, the peripheral region 62 and the central region 61 are demarcated by translating an edge of the display panel inward by 10-20% of the length H and the width V of the display panel, respectively; for example, the peripheral region 62 and the central region 61 are demarcated by translating an edge of the display panel inward by 10% of the length H and the width V of the display panel, respectively. It should be noted that, a boundary between the peripheral region 62 and the central region 61 may form other patterns, such as circle, oval and so on, as long as light leakage due to the optical path difference can be avoided by arranging an additional polarizer in a region corresponding to the peripheral region, which is not limited by the embodiment of the invention.

As shown in FIG. 2, in one embodiment, a first polarizer 4 is provided on a side of the array substrate 2 away from the liquid crystal layer 3, and a polarization axis of the additional polarizer 6 is in a same direction as a polarization axis of the first polarizer 4. In one embodiment, a second polarizer 5 is provided on a side of the color filter substrate 1 away from the liquid crystal layer 3, and a polarization axis of the second polarizer 5 is perpendicular to the polarization axis of the first polarizer 4. The arrangement of the additional polarizer 6 resumes an oval polarized light caused by the optical path difference on the array substrate 2 to be a linear polarized light, thus avoiding light leakage due to the optical path difference, i.e., effectively preventing the display panel from light leakage.

In a preparation process of a display device, an offset angle less than 2° is allowable between the polarization axis of the additional polarizer 6 and the polarization axis of the first polarizer 4, i.e., there is a certain included angle between the polarization axis of the additional polarizer 6 and the polarization axis of the first polarizer 4, and as long as the angle is less than 2°, the additional polarizer 6 also can reach a certain light transmitting effect (for example, a transmittance of the additional polarizer 6 can range from 60% to 80%), and even reach a most ideal light transmitting effect, 95%. It can be seen that, in at least one embodiment, a transmittance of the additional polarizer 6 can range from 60% to 95%.

In the embodiment of the invention, the additional polarizer 6 can be made of a Thin Crystal Film (TCF) including Methylol Carbamide Glycerol (MCG), and the thin crystal film including methylol carbamide glycerol is formed on a side of the array substrate 2 close to the liquid crystal layer 3. For example, the thin crystal film can be formed by coating. The transmittance of the thin crystal film can be effectively improved by using methylol carbamide glycerol.

As shown in FIG. 2, in one embodiment of the invention, the display device further comprises a back light unit 7; the back light unit 7 is arranged on a side of the array substrate 2 away from the liquid crystal layer 3, and a brightness of the back light unit 7 corresponding to the central region 61 is less than a brightness of the back light unit 7 corresponding to the peripheral region 62. That is, in the display device according to the embodiment of the present invention, with the additional polarizer 6, a light outgoing brightness of the back light unit 7 in the peripheral region 62 is lower than the light outgoing brightness of the back light unit 7 in the central region 61 without the additional polarizer 6, that is, the additional polarizer 6 is adopted to render a lower light transmittance, and generally when an image of a brightness is displayed, the peripheral region 62 will become dark, so in the embodiment, the brightness of the back light unit 7 corresponding to the peripheral region 62 is set to be much brighter than the brightness of the back light unit 7 corresponding to the central region 61. In this way, the brightness of the peripheral region 62 of the display device can be effectively increased as compared with the brightness of the central region 61, compensating a decreased brightness that might be caused by arranging the additional polarizer 6 in the peripheral region 62 of the display device, so that the peripheral region 62 and the central region 61 can have same brightness after light emitted from the back light unit 7 transmits through the additional polarizer 6, ensuring the display effect.

Figure 3:
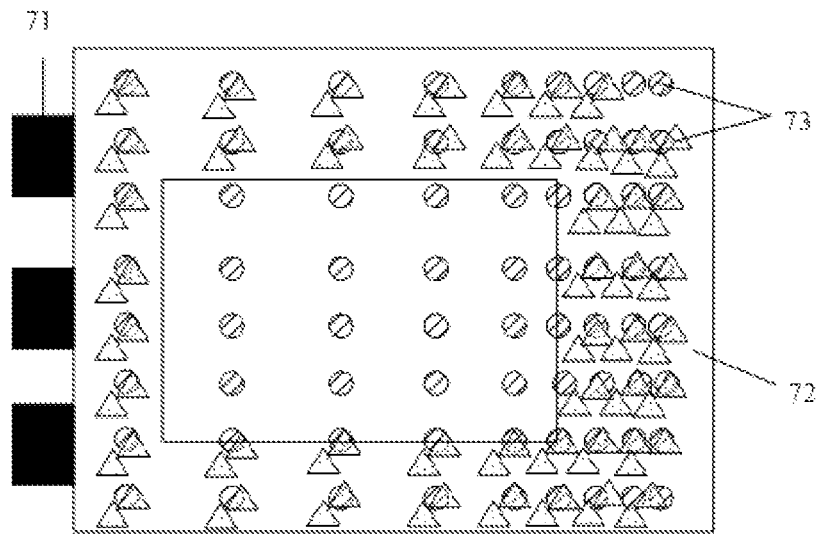
FIG. 3 is a structural schematic diagram of a light guiding plate in the embodiment of the invention.

As shown in FIG. 3, the back light unit 7 includes a light guiding plate 72 and a light source 71 arranged on at least one side of the light guiding plate 72, and a surface (an upper surface or a lower surface) of the light guiding plate 72 is provided with scattering patterns 73. A distribution intensity of the scattering patterns 73 may cooperate with the transmittance of the additional polarizer 6, and/or may cooperate with the brightness of the light source 71 (or, a distance between positions of the scattering patterns 73 and a position of the light source 71).

Figure 1:
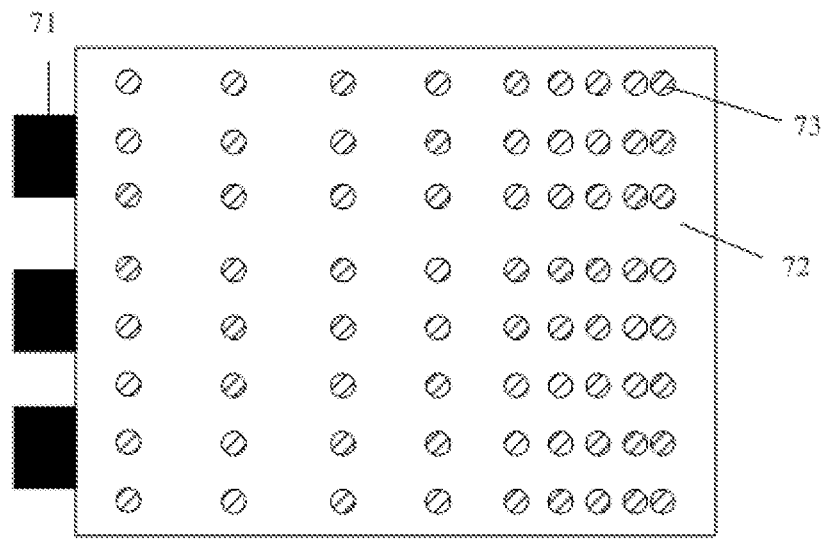
FIG. 1 is a structural schematic diagram of a light guiding plate.

In one embodiment, a distribution density of the scattering patterns 73 is inversely proportional to the transmittance of the additional polarizer 6. That is, the lower the transmittance of the additional polarizer 6 is, the higher the distribution density of the scattering patterns 73 is. In FIG. 3, in the embodiment, the scattering patterns 73 shown in triangle patterns on the surface of the light guiding plate 72 are newly-added light transmitting patterns as compared with the light guiding plate shown in FIG. 1; the distribution density of the scattering patterns 73 in the embodiment is much greater, when polarized light generated by the first polarizer 4 is incident into the additional polarizer 6, the transmittance is approximately between 60% and 80%, for example, 70%. A design example is: when the distribution density of the scattering patterns 73 is inversely proportional to the transmittance, for example, when the transmittance of the additional polarizer 6 is 70%, the distribution density of the corresponding scattering patterns 73 is 1/0.7=1.429; in that case, the distribution density of the scattering patterns 73 is increased by about 40%, as compared with the distribution density of the scattering patterns 73 as shown in FIG. 1.

Or, in at least one embodiment, a distribution density of the scattering patterns 73 is further inversely proportional to a distance to the light source 71. In the embodiment, the back light unit 7 may be of a side-light type or a direct-down type, the light source 71 can include an LED, the distribution density of the scattering patterns 73 is inversely proportional to a distance to the light source 71, i.e., the density of part of the scattering patterns 73 close to the light source 71 is greater than the density of part of the scattering patterns 73 away from the light source 71. For the additional polarizer 6 in the embodiment, the distribution density of the scattering patterns 73 in the light guiding plate 72 corresponding to the peripheral region 62 may be set to be higher than the distribution density of the scattering patterns 73 in the light guiding plate 72 corresponding to the central region 61.

The light guiding plate 72 is designed mainly based on geometrical optic principles, and a method used in the embodiment of the invention is to add a micro-feature structure on a surface of the light guiding plate 72. For example, the scattering patterns 73 are of V-cut, U-cut or triangular grooves or protrusions arranged on the surface (an upper surface or a lower surface) of the light guiding plate 72. The V-cut, U-cut or triangular grooves or protrusions are tiny zigzag or semi-circular structure, which are configured for changing a total reflection of light in the light guiding plate 72, guiding light from an edge direction to a viewing direction, and increasing brightness as well as making the light uniform. The scattering patterns 73 can be carved by a diamond cutter on the light guiding plate 72 (it is only necessary to make a "V", "U" or Δ-like scratch on the surface of the light guiding plate 72 when forming a groove). Tests show that, with the arrangement of the scattering patterns 73, the brightness of the back light unit 7 can be improved by 10% to 15%; and it is proved that, by taking both optical design and molding into consideration during the design for the light guiding plate 72, the micro-feature structure is adopted, which is conducive to not only the design of the light guiding plate, but also an injection molding of the light guiding plate in the preparation process, so that a development and design period of product can be shortened, which is of great significance in improving a quality of the light guiding plate 72.

The display device exemplified by the embodiment of the present invention can form any product or part with a display function, such as a liquid crystal panel, E-paper, a mobile phone, a tablet computer, a television, a monitor, a laptop computer, a digital photo frame and a navigator and so on. Moreover, the display device exemplified by the embodiment of the present invention is particularly suitable for forming the liquid crystal display device of horizontal alignment mode, such as IPS, ADS and so on, with the advantages of higher pixel aperture ratio, wide viewing angle, high brightness, low power consumption and so on.

In the display device provided by the embodiment of the present invention, by arranging an additional polarizer in a region between the array substrate and the liquid crystal layer of the display panel and corresponding to the peripheral region, light leakage in the peripheral region of the display device can be effectively prevented, and the problem of light leakage in the peripheral region of the display panel can be solved; meanwhile, a back light unit making the peripheral region much brighter than the central region is adopted correspondingly, so that the uniformity of the display image is ensured, and good overall image quality can also be provided in the normal dark mode.

It can be understood that, the foregoing implementation modes merely are exemplary implementation modes for explaining the principles of the present invention, but the invention is not limited thereto. One person ordinarily skilled in the art can make various changes or modifications to the present invention without departing from the spirit and scope of the invention, and such changes or modifications are also deemed as the scope of the present invention.

The present application claims priority of Chinese Patent Application No. 201410324068.5 filed on Jul. 8, 2014, the disclosure of which is incorporated herein by reference in its entirety as part of the present application.

What is claimed is:

1. A display device, comprising a display panel,
wherein the display panel includes an opposed substrate and an array substrate arranged opposite to each other, and a liquid crystal layer arranged therebetween; and
the display panel is divided into a central region and a peripheral region surrounding the central region; and an additional polarizer is only arranged in a region between the array substrate and the liquid crystal layer and corresponding to the peripheral region,
the additional polarizer is made of a thin crystal film including methylol carbamide glycerol, and the thin crystal film is formed on a side of the array substrate close to the liquid crystal layer.

2. The display device according to claim 1, wherein a first polarizer is provided on a side of the array substrate away from the liquid crystal layer, and a polarization axis of the additional polarizer is in a same direction as a polarization axis of the first polarizer.

3. The display device according to claim 2, wherein a second polarizer is provided on a side of the opposed substrate away from the liquid crystal layer, and a polarization axis of the second polarizer is perpendicular to the polarization axis of the first polarizer.

4. The display device according to claim 2, further comprising a back light unit,
wherein the back light unit is arranged on a side of the array substrate away from the liquid crystal layer, and a brightness of the back light unit corresponding to the central region is less than a brightness of the back light unit corresponding to the peripheral region, such that the peripheral region and the central region have a same brightness after light emitted from the back light unit transmits through the additional polarizer.

5. The display device according to claim 4, wherein the back light unit includes a light guiding plate and a light source arranged on at least one side of the light guiding plate, and a surface of the light guiding plate is provided with scattering patterns.

6. The display device according to claim 4, wherein a distribution density of the scattering patterns is inversely proportional to a transmittance of the additional polarizer.

7. The display device according to claim 4, wherein a distribution density of the scattering patterns is further inversely proportional to a distance to the light source.

8. The display device according to claim 2, wherein the peripheral region and the central region are demarcated by translating an edge of the display panel inward by 10-20% of a length and a width of the display panel, respectively.

9. The display device according to claim 2, wherein the opposed substrate is a color filter substrate.

10. The display device according to claim 1, wherein a transmittance of the additional polarizer ranges from 60% to 95%.

11. The display device according to claim 10, wherein the transmittance of the additional polarizer ranges from 60% to 80%.

12. The display device according to claim 1, further comprising a back light unit,
wherein the back light unit is arranged on a side of the array substrate away from the liquid crystal layer, and a brightness of the back light unit corresponding to the central region is less than a brightness of the back light unit corresponding to the peripheral region, such that the peripheral region and the central region have a same brightness after light emitted from the back light unit transmits through the additional polarizer.

13. The display device according to claim 12, wherein the back light unit includes a light guiding plate and a light source arranged on at least one side of the light guiding plate, and a surface of the light guiding plate is provided with scattering patterns.

14. The display device according to claim 13, wherein a distribution density of the scattering patterns is inversely proportional to a transmittance of the additional polarizer.

15. The display device according to claim 13, wherein a distribution density of the scattering patterns is further inversely proportional to a distance to the light source.

16. The display device according to claim 13, wherein the scattering patterns are of V-cut, U-cut or triangular grooves or protrusions.

17. The display device according to claim 1, wherein the peripheral region and the central region are demarcated by translating an edge of the display panel inward by 10-20% of a length and a width of the display panel, respectively.

18. The display device according to claim 1, wherein the opposed substrate is a color filter substrate.

* * * * *